United States Patent
Modeel

(10) Patent No.: US 10,628,290 B2
(45) Date of Patent: Apr. 21, 2020

(54) GENERATING AN INNER CLOUD ENVIRONMENT WITHIN AN OUTER CLOUD ENVIRONMENT FOR TESTING A MICROSERVICE APPLICATION

(71) Applicant: Red Hat, Inc., Raleigh, NC (US)

(72) Inventor: Subin Modeel, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/883,164

(22) Filed: Jan. 30, 2018

(65) Prior Publication Data
US 2019/0235993 A1    Aug. 1, 2019

(51) Int. Cl.
*G06F 11/36*    (2006.01)
*G06F 8/60*    (2018.01)

(52) U.S. Cl.
CPC ............ *G06F 11/3664* (2013.01); *G06F 8/60* (2013.01); *G06F 11/3688* (2013.01); *G06F 11/3696* (2013.01)

(58) Field of Classification Search
None
See application file for complete search history.

(56) References Cited

U.S. PATENT DOCUMENTS

| 9,262,300 | B1* | 2/2016 | Haba ..................... G06F 11/362 |
| 2009/0193173 | A1* | 7/2009 | Joshi ....................... G06F 9/455 |
| | | | 711/6 |
| 2013/0232498 | A1* | 9/2013 | Mangtani .............. G06F 9/5072 |
| | | | 718/104 |
| 2015/0120893 | A1* | 4/2015 | Sapaliga ................... G06F 8/60 |
| | | | 709/222 |
| 2015/0149535 | A1* | 5/2015 | Howard .................. H04L 67/34 |
| | | | 709/203 |
| 2017/0024717 | A1 | 1/2017 | Istrati |
| 2017/0046146 | A1* | 2/2017 | Jamjoom .................. G06F 8/62 |
| 2017/0255455 | A1 | 9/2017 | Collier et al. |
| 2017/0322826 | A1* | 11/2017 | Furuhashi ........... G06F 9/45558 |
| 2017/0339121 | A1 | 11/2017 | Eberlein |
| 2019/0075115 | A1* | 3/2019 | Anderson ............. H04L 63/083 |

OTHER PUBLICATIONS

Halonen, R., "Improving Visibility of Test Results for Continuous Integration and Delivery Pipeline," Nov. 2017, https://www.theseus.fi/bitstream/handle/10024/136017/Halonen_Riku.pdf?seguence=1&isAllowed=y.

(Continued)

*Primary Examiner* — Daxin Wu
(74) *Attorney, Agent, or Firm* — Kilpatrick Townsend & Stockton LLP

(57) ABSTRACT

A microservice application can be tested inside an inner cloud environment that is within an outer cloud environment. For example, a software application can generate an inner cloud environment within an outer cloud environment in response to an event associated with a microservice application. The software application can then deploy another version of the microservice application in the inner cloud environment. The software application can perform at least one test on the other version of the microservice application in the inner cloud environment to determine a compatibility of the other version of the microservice application with the inner cloud environment.

20 Claims, 3 Drawing Sheets

(56) References Cited

OTHER PUBLICATIONS

Ravula, S., "Achieving Continuous Delivery of Immutable Containerized Microservices with Mesos/Marathon," Aalto University School of Science, May 19, 2017, https://aaltodoc.aalto.fi/bitstream/handle/123456789/27061/master_Ravula_Shashi_2017.pdf?sequence=1&isAllowed=y.
Reselman, B., "Understanding Contract Testing for Microservices," Jul. 17, 2017, http://www.mabl.com/blog/understanding-contract-testing-microservices-mabl.
Zuniga-Prieto, M., et al., "Incremental Integration of Microservices in Cloud Applications," University of Cuenca, Cuena, Ecuador, Polytechnic University of Valencia, Valencia, Spain, 2016, https://aisel.aisnet.org/cgl/viewcontent.cgi?article=1108&context=isd2014.
"Designing Microservices: Continuous Integration," Dec. 8, 2017, https://docs.microsoft.com/en-us/azure/architecture/microservices/ci-cd.

\* cited by examiner

GENERATING AN INNER CLOUD ENVIRONMENT WITHIN AN OUTER CLOUD ENVIRONMENT FOR TESTING A MICROSERVICE APPLICATION

TECHNICAL FIELD

The present disclosure relates generally to software development and management. More specifically, but not by way of limitation, this disclosure relates to generating an inner cloud environment within an outer cloud environment for testing a microservice application.

BACKGROUND

Cloud environments provide a variety of services to consumers on demand using shared pool of computing resources (e.g., networks, network bandwidth, servers, processing, memory, storage, applications, containers, virtual machines, or any combination of these). Examples of cloud environments can include a software-as-a-service (SaaS) environment, a platform-as-a-service (PaaS) environment, or an infrastructure-as-a-service (IaaS) environment.

Some cloud environments can run microservice applications. A microservice application can be a software application that is structured as a collection of loosely coupled, stateless services that communicate with each other through application programming interfaces (APIs). These stateless services can be referred to as microservices. As one example, a microservice application can include two or more microservices, with well-defined web service APIs, working together to generate responses to end-user requests. Individual microservices may be "owned" or developed by different developers, with each microservice being developed, updated, and deployed independently of other microservices. Microservice applications can provide improvements to scalability, robustness, isolation, and development time over conventional applications, such as monolithic applications.

DETAILED DESCRIPTION

Figure 1:
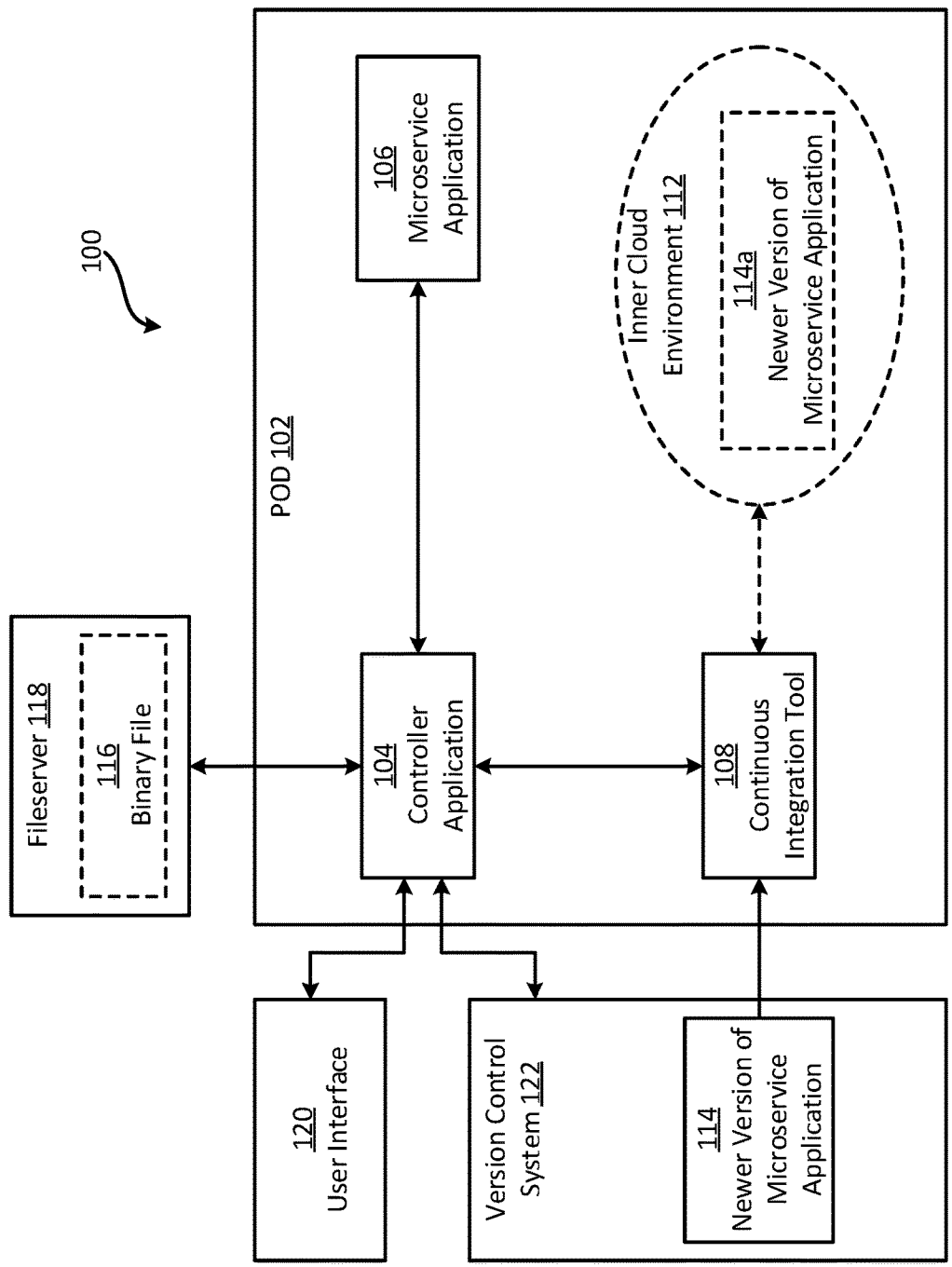
FIG. 1 is a block diagram of an example of a system for generating an inner cloud environment within an outer cloud environment for testing a microservice application according to some aspects.

There can be disadvantages running microservice applications in a cloud environment. For example, microservice applications are typically closely tied to the underlying architecture (e.g., hardware or software architecture) of the cloud environment. If the underlying architecture of the cloud environment changes, the microservice applications may break. For example, updating the cloud environment's software may cause a microservice application to have an error, fail, shut down, or any combination of these. This can result in significant downtime and a variety of other issues.

As one particular example, a cloud environment may be running a microservice application that is compatible with a particular version of OpenShift™ by Red Hat™. And if the cloud environment's version of OpenShift™ is updated to a new version, the microservice application may break. This, in turn, may cause other applications that rely on the microservice application to break. A user must then perform a lengthy and difficult debugging process, which can involve first determining that the microservice application broke, then determining why the microservice application broke, then determining if a newer version of the microservice is available and compatible with the new version of OpenShift™, and finally deploying the newer version of the microservice application in the cloud environment.

Some examples of the present disclosure can overcome one or more of the abovementioned issues by automatically (i) detecting that a microservice application broke in a cloud environment, which can be referred to as an outer cloud environment; (ii) obtaining another version of the microservice application; (iii) generating an inner cloud environment that exists within the outer cloud environment; (iv) testing the other version of the microservice application in the inner cloud environment for compatibility with the inner cloud environment; (v) notifying a user of the results of the test(s); and (vi) shutting down the inner cloud environment, for example, to free up computing resources consumed by the inner cloud environment. By automatically performing some or all of the above-mentioned steps, downtime associated with a broken microservice application can be significantly reduced.

More specifically, the inner cloud environment can be configured to have similar characteristics to the outer cloud environment (e.g., after the update or other change). For example, if the outer cloud environment is updated to run a newer (or older) version of OpenShift™, the inner cloud environment can also run the newer (or older) version of OpenShift™ This can enable the inner cloud environment to serve as a proxy for the outer cloud environment, so that the compatibility of the other version of the microservice application with the outer cloud environment can be determined, without risking damage to the outer cloud environment.

In some examples, if the other version of the microservice application passes the tests, a notification can be transmitted to a user indicating (i) that the microservice application broke; (ii) that another, compatible version of the microservice application is available; (iii) a location from which the other version of the microservice application can be retrieved (e.g., downloaded); or (iv) any combination of these. The user can then retrieve and deploy the other version of the microservice application in the outer cloud environment. Alternatively, if the other version of the microservice application passes the tests, the other version of the microservice application can automatically be deployed in the outer cloud environment, with little or no manual involvement by a user. This can help reduce the downtime associated with the broken microservice application.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for generating an inner cloud environment 112 within an outer cloud environment 100 for testing a microservice application 106 according to some aspects. In this example, the outer cloud environment 100 is a PaaS environment that includes a pod 102. A pod can be a group of relatively tightly-coupled containers (e.g., isolated virtual environments, such as Docker™ containers) that can have shared storage, network resources, or both. The pod 102 can include a microservice application 106 formed from microservices collectively working together to implement various functionality.

The pod 102 can also include a controller application 104. The controller application 104 is a software application that can detect an event associated with the microservice application 106. One example of an event can include the microservice application 106 breaking (e.g., having an error). To detect such an event, the controller application 104 can monitor the microservice application 106 or an event log, which may maintain records of application failures. Another example of an event can include a newer version of the microservice application 106 being available. To detect such an event, the controller application 104 can communicate with a version control system 122, such as Git™, to determine if a newer version of the microservice application 106 is available. If the controller application 104 detects the event, the controller application 104 can transmit a command associated with the event.

The pod 102 can also include a continuous integration tool 108. A continuous integration tool is a software application that can automatically save, build, and test updates to program code (for software) at frequent intervals to help identify program-code errors more quickly and easily. Examples of a continuous integration tool can be Jenkins™, Buildbot, Travis CI, Strider, Go, and Integrity. In some examples, the continuous integration tool 108 can perform additional or alternative functionality. For example, the continuous integration tool 108 can receive the command from the controller application 104 and, in response to the command, execute a pipeline for building and testing a newer version of the microservice application 114, which can be newer in time or version number than the microservice application 106 that is already in the pod 102. More specifically, the controller application 104 can generate a privileged namespace in which the continuous integration tool 108 can execute the pipeline. Executing the pipeline can involve retrieving the newer version of the microservice application 114 (e.g., from the version control system 122 or another repository) and creating a binary file for the newer version of the microservice application 114. The binary file can enable the newer version of the microservice application 114 to be deployed. The continuous integration tool 108 can then generate an inner cloud environment 112, such as a PaaS environment. For example, the continuous integration tool 108 can generate an ephemeral PaaS microservice instance on which the newer version of the microservice application 114a can be deployed. The continuous integration tool 108 can then deploy and test the newer version of the microservice application 114a in the inner cloud environment 112. For example, the continuous integration tool 108 can perform one or more integration tests on the newer version of the microservice application 114a in the inner cloud environment 112.

If the newer version of the microservice application 114a passes the tests, the continuous integration tool 108 can transmit an electronic communication to the controller application 104 indicating that the newer version of the microservice application 114a passed the tests. In some examples, the controller application 104 can respond to the electronic communication by storing a copy of the binary file 116 in a location (e.g., fileserver 118) from which the binary file 116 can be subsequently downloaded. Additionally or alternatively, the continuous integration tool 108 may update a user interface 120 with information about the event, a location from which the binary file 116 can be retrieved, or both.

As mentioned above, the outer cloud environment 100 can have a user interface 120. The user interface 120 can include information about applications running within the outer cloud environment 100. A user may be able to login to the user interface 120 or otherwise view the user interface 120 to monitor the status of these applications. In some examples, the user interface 120 can indicate (i) that the event associated with the microservice application 106 occurred, (ii) that the newer version of the microservice application 114 is available and compatible with the outer cloud environment 100, (iii) a location from which the binary file 116 can be retrieved, or (iv) any combination of these. The user interface 120 may be a textual user interface or a graphical user interface, such as a dashboard having a name of the microservice application 106 that failed and a link (e.g., a uniform resource locator) to a location from which the newer version of the microservice application 114 can be downloaded.

After testing the newer version of the microservice application 114, the continuous integration tool 108 can shut down the inner cloud environment 112. For example, once the continuous integration tool 108 determines that the test(s) are complete, the continuous integration tool 108 can shut down the inner cloud environment 112. Additionally or alternatively, the controller application 104 can delete the privileged namespace that was used to run the continuous integration tool's pipeline. This may help conserve computing resources.

The above examples are illustrative, and numerous modifications are possible. For example, the outer cloud environment 100 may exclude the pod 102. As another example, the microservice application 106, the controller application 104, the continuous integration tool 108, the inner cloud environment 112, or any combination of these, may be outside the pod 102. Additionally or alternatively, the fileserver 119, version control system 122, newer version of the microservice application 114, or any combination of these, may be within the pod 102. In some examples, the functionality of the controller application 104 and the continuous integration tool 108 can be switched, combined, distributed among additional or different software applications, or otherwise modified. For example, the continuous integration tool 108, rather than the controller application 104, can store the copy of the binary file 116b on the fileserver 118, generate the user interface 120, or both. Further, the examples described herein can be applied to other types of applications (other than microservice applications). For example, the controller application 104 may detect an event associated with another type of application, transmit a command to the continuous integration tool 108 in response to the event, whereby the command causes the continuous integration tool 108 to retrieve and test a newer version of the application in the inner cloud environment 112.

Figure 2:
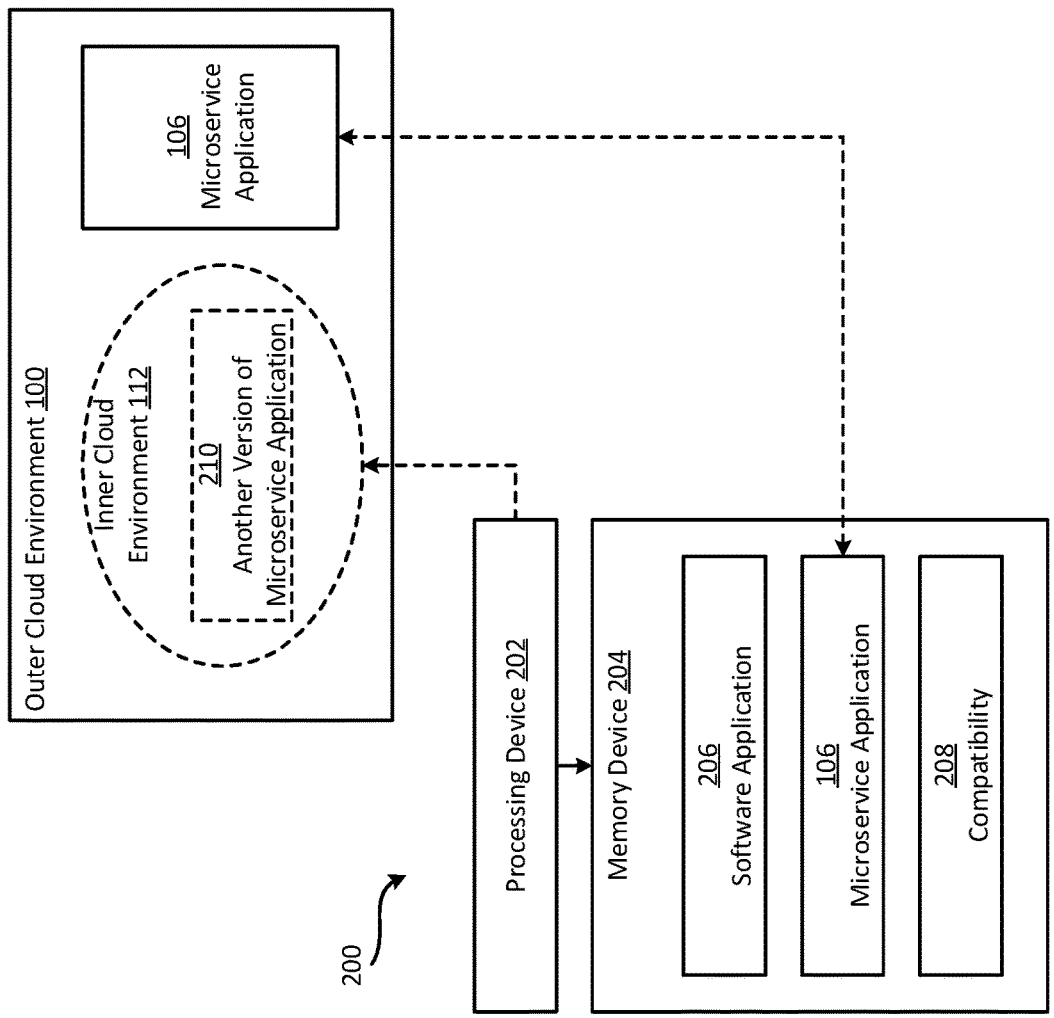
FIG. 2 is a block diagram of another example of a system for generating an inner cloud environment within an outer cloud environment for testing a microservice application according to some aspects.

FIG. 2 is a block diagram of another example of a system 200 for generating an inner cloud environment 112 within an outer cloud environment 100 for testing a microservice application 106 according to some aspects. The system 200 includes a processing device 202 communicatively coupled to a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions stored in the memory device 204 to perform operations. In some examples, the instructions can include processor-specific instructions generated by a compiler or an interpreter from code written in any suitable computer-programming language, such as C, C++, C #, etc. The instructions can form one or more software applications, such the controller application 104 of FIG. 1, the continuous integration tool of FIG. 1, the microservice application 106, the software application 206, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 204 can include a software application 206. The software application 206 may include the controller application 104 of FIG. 1, the continuous integration tool 108 of FIG. 1, both of these, or neither of these. The processing device 202 can execute the software application 206 to implement any amount and combination of the functionality described herein. For example, the processing device 202 can execute the software application 206 to detect an event associated with the microservice application 106 (or another type of application), generate an inner cloud environment 112 within the outer cloud environment 100, retrieve another version of the microservice application 210, and test the other version of the microservice application 210 in the inner cloud environment 112. After testing the other version of the microservice application 210, the processing device 202 can store information about the compatibility 208 of the microservice application 114a with the inner cloud environment 112 in the memory device 204.

Figure 3:
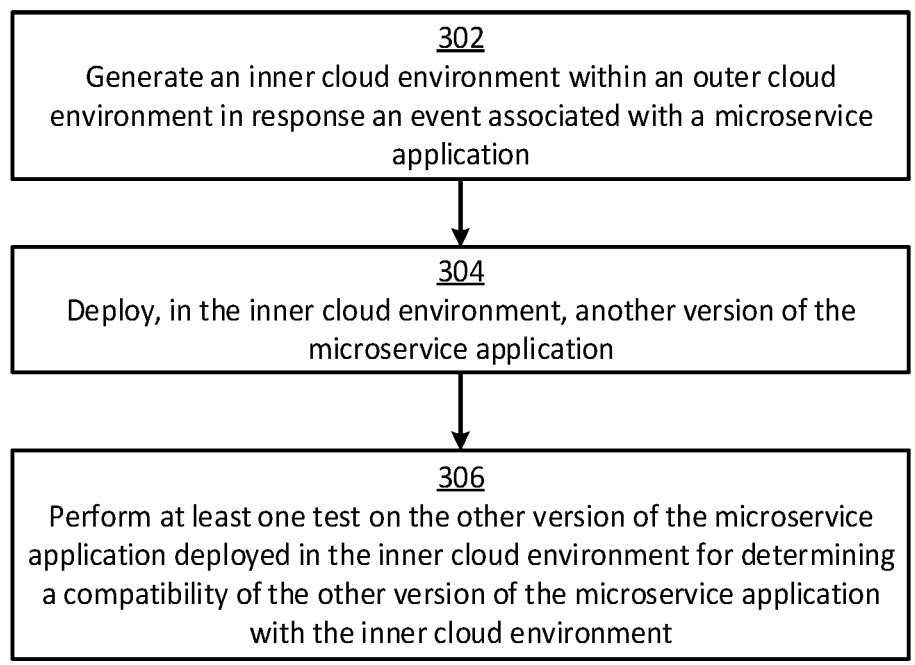
FIG. 3 is a flow chart of an example of a process for generating an inner cloud environment within an outer cloud environment for testing a microservice application according to some aspects.

In some examples, the system 200 can implement some or all of the steps shown in FIG. 3. In other examples, the system 200 can implement more steps, fewer steps, different steps, or a different order of the steps depicted in FIG. 3. The steps of FIG. 3 are described below with reference to components discussed above.

In block 302, the processing device 202 generates an inner cloud environment 112 within an outer cloud environment 100 in response to an event associated with a microservice application 106. In some examples, the outer cloud environment 100 is a PaaS environment and the inner cloud environment 112 is a "mini"-PaaS environment. The processing device 202 may generate the inner cloud environment 112 by running a microservice image of the PaaS.

In block 304, the processing device 202 deploys, in the inner cloud environment 112, another version of the microservice application 210. The other version of the microservice application 210 can be a newer version of the microservice application 114, an older version of the microservice application (e.g., that may be compatible with the changed architecture of the outer cloud environment 100), or an otherwise different version of the microservice application than the version of the microservice application 107 that is within the outer cloud environment 100. The processing device 202 can obtain program code for the other version of the microservice application 210 from a repository or a version control system 122. The processing device 202 can then use the program code to create a build image for the other version of the microservice application 210. The processing device 202 can then use the build image to deploy the other version of the microservice application 210 within the inner cloud environment 112.

In block 406, the processing device 202 performs at least one test on the other version of the microservice application 210 deployed in the inner cloud environment 112 for determining a capability of the other version of the microservice application 210 with the inner cloud environment 112. For example, the processing device 202 can perform an integration test that is specific to the inner cloud environment 112 to determine the capability of the other version of the microservice application 210 with the inner cloud environment 112.

In some examples, the processing device 202 can execute the software application 206 to implement some or all of the above steps. As noted above, the software application 206 can represent the controller application 104, the continuous integration tool 108, both of these, or neither of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A method comprising:
    detecting, by a processing device, an error associated with execution of a microservice application in an outer cloud environment;
    in response to detecting the error, automatically generating, by the processing device, an inner cloud environment within the outer cloud environment, wherein the inner cloud environment is configured with characteristics that mimic aspects of the outer cloud environment such that the inner cloud environment is usable as a proxy for the outer cloud environment;
    in response to generating the inner cloud environment, deploying, by the processing device, another version of the microservice application within the inner cloud environment; and
    subsequent to deploying the other version of the microservice application in the inner cloud environment, determining, by the processing device, a compatibility of the other version of the microservice application with the inner cloud environment by performing at least one test on the other version of the microservice application deployed in the inner cloud environment.

2. The method of claim 1, wherein:
    the microservice application is executing in the outer cloud environment while the other version of the microservice application is also executing in the inner cloud environment; and
    the inner cloud environment is deployed by a continuous integration tool.

3. The method of claim 2, wherein the outer cloud environment is a first platform as a service (PaaS) environment, and the inner cloud environment is a second PaaS environment that is within a pod within the first PaaS environment.

4. The method of claim 2, further comprising:
detecting, by a controller application that is separate from the continuous integration tool, the error associated with the microservice application; and
transmitting, by the controller application, a command to the continuous integration tool in response to detecting the error, the command being configured to cause the continuous integration tool to generate the inner cloud environment.

5. The method of claim 4, further comprising, subsequent to performing the at last one test on the other version of the microservice application:
determining, by the continuous integration tool, that the at least one test is complete;
shutting down, by the continuous integration tool, the inner cloud environment in response to determining that that the at least one test is complete;
transmitting, by the continuous integration tool, an indication that the other version of the microservice application passed the at least one test to the controller application; and
causing, by the controller application and in response to receiving the indication, the other version of the microservice application to be stored to a fileserver that is accessible to one or more users, thereby enabling the one or more users to download the other version of the microservice application.

6. The method of claim 5, further comprising generating a user interface indicating the error associated with the microservice application and a location on the fileserver from which the other version of the microservice application is downloadable.

7. A system comprising:
a processing device; and
a memory device comprising instructions executable by the processing device for causing the processing device to:
detect an error associated with execution of a microservice application in an outer cloud environment;
in response to detecting the error, automatically generate an inner cloud environment within the outer cloud environment, wherein the inner cloud environment is configured with characteristics that mimic aspects of the outer cloud environment such that the inner cloud environment is usable as a proxy for the outer cloud environment;
in response to generating the inner cloud environment, deploy another version of the microservice application in the inner cloud environment; and
subsequent to deploying the other version of the microservice application in the inner cloud environment, determine a compatibility of the other version of the microservice application with the inner cloud environment by performing at least one test on the other version of the microservice application deployed in the inner cloud environment.

8. The system of claim 7, wherein:
the microservice application is executing in the outer cloud environment while the other version of the microservice application is executing in the inner cloud environment; and
the inner cloud environment is deployed by a continuous integration tool.

9. The system of claim 7, wherein the outer cloud environment is a first platform as a service (PaaS) environment, and the inner cloud environment is a second PaaS environment within the first PaaS environment.

10. The system of claim 7, wherein the memory device further comprises instructions that are executable by the processing device for causing the processing device to:
transmit a command to a continuous integration tool in response to detecting the error, the command being configured to cause the continuous integration tool to generate the inner cloud environment.

11. The system of claim 7, wherein the memory device further comprises instructions that are executable by the processing device for causing the processing device to:
determine that the at least one test is complete;
shut down the inner cloud environment in response to determining that the at least one test is complete; and
store the other version of the microservice application to a fileserver that is accessible to one or more users to enable the one or more users to retrieve the other version of the microservice application.

12. The system of claim 11, wherein the memory device further comprises instructions that are executable by the processing device for causing the processing device to, subsequent to storing the other version of the microservice application to the fileserver:
generate a user interface indicating the error associated with the microservice application and a location on the fileserver from which the other version of the microservice application is retrievable.

13. A non-transitory computer-readable medium comprising instructions that are executable by a processing device for causing the processing device to:
detect an error associated with execution of a microservice application in an outer cloud environment;
in response to detecting the error, automatically generate an inner cloud environment within the outer cloud environment, wherein the inner cloud environment is configured with characteristics that mimic aspects of the outer cloud environment such that the inner cloud environment is usable as a proxy for the outer cloud environment;
in response to generating the inner cloud environment, deploy another version of the microservice application in the inner cloud environment; and
subsequent to deploying the other version of the microservice application in the inner cloud environment, determine a compatibility of the other version of the microservice application with the inner cloud environment by performing at least one test on the other version of the microservice application deployed in the inner cloud environment.

14. The non-transitory computer-readable medium of claim 13, wherein at least some of the instructions form part of a continuous integration tool.

15. The non-transitory computer-readable medium of claim 13, wherein the outer cloud environment is a first platform as a service (PaaS) environment, and the inner cloud environment is a second PaaS environment within the first PaaS environment.

16. The non-transitory computer-readable medium of claim 13, further comprising instructions that are executable by the processing device for causing the processing device to:

transmit a command in response to detecting the error, the command being configured to cause a continuous integration tool to generate the inner cloud environment.

17. The non-transitory computer-readable medium of claim 13, further comprising instructions that are executable by the processing device for causing the processing device to:

determine that the microservice application passed the at least one test; and store a binary file of the other version of the microservice application to a location in response to determining that the microservice application passed the at least one test, the location being accessible to one or more users for retrieving the other version of the microservice application.

18. The non-transitory computer-readable medium of claim 13, further comprising instructions that are executable by the processing device for causing the processing device to:

generate a graphical user interface indicating the error associated with the microservice application and a location from which the other version of the microservice application is retrievable.

19. The method of claim 1, wherein the other version of the microservice application is automatically deployed in the inner cloud environment in response to generating the inner cloud environment.

20. The method of claim 1, wherein the at least one test is automatically performed in the inner cloud environment in response to deploying the other version of the microservice application in the inner cloud environment.

* * * * *